US012673510B2

(12) United States Patent
Korolik et al.

(10) Patent No.: US 12,673,510 B2
(45) Date of Patent: Jul. 7, 2026

(54) MODULAR PALLET

(71) Applicant: Kornit Digital Ltd., Rosh HaAyin (IL)

(72) Inventors: Pavel Korolik, Petah Tikva (IL); Gerald David, Tel Mond (IL); Ilan Shmuel Mano, Ramat-Gan (IL); Hasan Shriem, Taybe (IL); Harel Yizhak, Rehovot (IL)

(73) Assignee: Kornit Digital Ltd., Rosh HaAyin (IL)

( * ) Notice: Subject to any disclaimer, the term of this patent is extended or adjusted under 35 U.S.C. 154(b) by 0 days.

(21) Appl. No.: 18/008,697

(22) PCT Filed: Jun. 7, 2021

(86) PCT No.: PCT/IL2021/050681
§ 371 (c)(1),
(2) Date: Dec. 7, 2022

(87) PCT Pub. No.: WO2021/250659
PCT Pub. Date: Dec. 16, 2021

(65) Prior Publication Data

US 2023/0191807 A1 Jun. 22, 2023

Related U.S. Application Data

(60) Provisional application No. 63/035,782, filed on Jun. 7, 2020.

(51) Int. Cl.
*B41J 11/06* (2006.01)
*B41J 3/407* (2006.01)
*B41J 11/20* (2006.01)

(52) U.S. Cl.
CPC ............ *B41J 11/06* (2013.01); *B41J 3/4078* (2013.01); *B41J 11/20* (2013.01)

(58) Field of Classification Search
CPC ......... B41J 11/06; B41J 11/20; B41J 3/4078; B41F 15/18
See application file for complete search history.

(56) References Cited

U.S. PATENT DOCUMENTS 6,640,714 B1 11/2003 Papa
6,908,190 B2 6/2005 Iwatsuki et al.
(Continued)

FOREIGN PATENT DOCUMENTS

CN 205149239 4/2016
CN 109515011 3/2019
(Continued)

OTHER PUBLICATIONS

International Search Report and the Written Opinion Dated Aug. 26, 2021 From the International Searching Authority Re. Application No. PCT/IL2021/0500681. (8 Pages).
(Continued)

*Primary Examiner* — Stephen D Meier
*Assistant Examiner* — Quang X Nguyen

(57) ABSTRACT

A modular pallet for a textile printing machine, to hold textile products of different shapes and sizes to allow for effective printing on the products, the modular pallet having two parts, a first part which is fixed to the printing machine and is designed for removably fitting a second, modular part. The second part is made up of a range of exchangeable parts which are shaped and configured for different textile products. Each exchangeable part is able to fit into the first part, so that the pallet can be modified for printing different textile products.

21 Claims, 8 Drawing Sheets

(56) References Cited

U.S. PATENT DOCUMENTS

Figure 1:
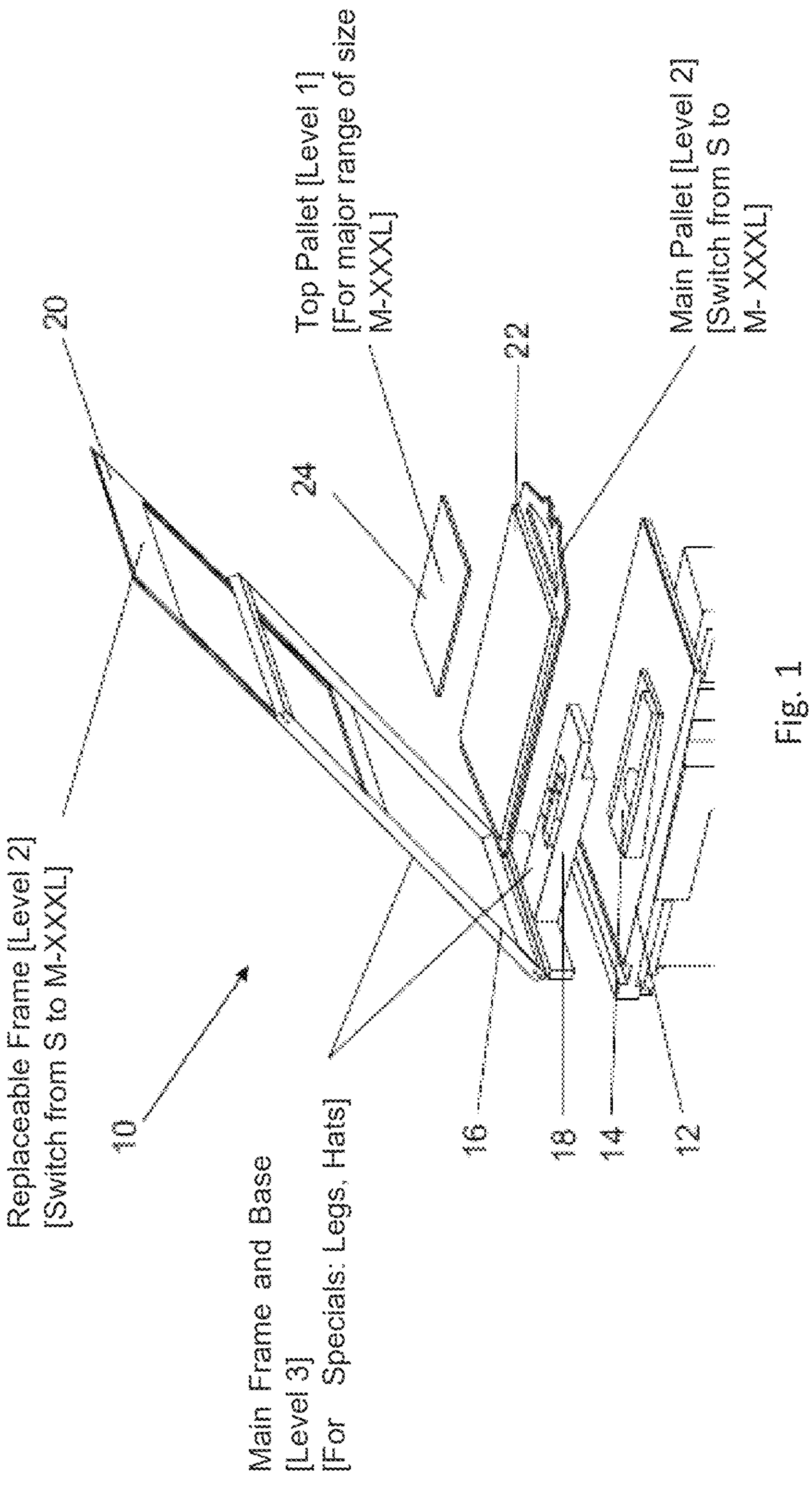

| | | | | |
|---|---|---|---|---|
| 7,765,927 | B1 | 8/2010 | Liu et al. | |
| 9,611,974 | B2 | 4/2017 | Hamada | |
| 9,821,574 | B2 * | 11/2017 | Fujimori | B41J 3/4078 |
| 11,298,961 | B1 * | 4/2022 | Baharal | B41F 15/22 |
| 2013/0278698 | A1 | 10/2013 | Takeuchi et al. | |
| 2015/0360460 | A1 * | 12/2015 | Livingston | B41F 15/28 347/110 |
| 2018/0333949 | A1 | 11/2018 | Edwards | |
| 2019/0381808 | A1 * | 12/2019 | Friedrich | B41J 11/20 |

FOREIGN PATENT DOCUMENTS

| | | |
|---|---|---|
| CN | 111114149 | 5/2020 |
| JP | 2004-291399 | 10/2004 |
| WO | WO 2021/250659 | 12/2021 |

OTHER PUBLICATIONS

International Preliminary Report on Patentability Dated Dec. 22, 2022 From the International Bureau of WIPO Re. Application No. PCT/IL2021/0500681. (5 Pages).

Supplementary European Search Report and the European Search Opinion Dated May 31, 2024 From the European Patent Office Re. Application No. 21822750.2. (10 Pages).

Communication Pursuant to Article 94(3) EPC Dated Jan. 22, 2025 From the European Patent Office Re. Application No. 21822750.2 (6 Pages).

* cited by examiner

MODULAR PALLET

RELATED APPLICATION/S

This application is a National Phase of PCT Patent Application No. PCT/IL2021/050681 having International filing date of Jun. 7, 2021 which claims the benefit of priority under 35 USC § 119 (e) of U.S. Provisional Patent Application No. 63/035,782 filed on Jun. 7, 2020. The contents of the above applications are all incorporated by reference as if fully set forth herein in their entirety.

FIELD AND BACKGROUND OF THE INVENTION

The present invention, in some embodiments thereof, relates to a pallet and, more particularly, but not exclusively, to a holding or feeding pallet for a textile printing machine.

In order to print on a garment, the garment needs to be held taut and level. Thus a feed structure that includes a tray to provide a surface and a frame to hold the garment in position on the tray, is generally used. Garments come in different shapes and sizes so that not all pallets are suitable for all garments. A pallet for a textile printing machine is typically big and heavy, and not easy for operators to manipulate. That is to say it may be challenging for operators to change the pallet over in order to print a different garment size or kind of garment or other textile product. Nevertheless, it is generally necessary to have a pallet that is correct for the size or shape of the garment etc., and exemplary digital textile printers print digitally on garments that are loaded manually on pallets, according to their type, so that there are specialized pallets for shirts, bags, sleeves, hoodies, etc. all of assorted sizes. Therefore, there is a constant need to change pallets on the printer, to support all different applications. Thus a change of pallet may be needed for different garment sizes, such as baby garments, child garments, adult garments, overalls, and even tote bags and other textile based accessories. The pallet may typically weigh more than 10 kg and thus changing the pallet for different sizes or shapes of garment takes time and not all operators may physically be up to the task.

Current pallet solutions are typically standalone pallets in which each of the pallets contains all the technical systems needed for its operation. Examples of such included technical systems are the gas-springs, safety latch, open/close latch, open/close handle, magnets, hinges, etc.

The result is that the pallet contains many complex parts, with high cost and high weight. All the above-mentioned mechanical features are part of the pallet and every time a different sized garment is printed, the pallet needs to be removed and replaced with a different pallet. A range of sizes and shapes of pallet are provided with the machine and more specialized sizes and shapes may have to be ordered and manufactured separately.

The all-in-one concept is thus not scalable or modular and not accurate enough for the printer's requirements. There are many interchangeable parts to support all applications; the combination of parts required for each application is relatively complicated and not all applications can be achieved by all-in-one pallets as supplied, thus limiting the usability of the machine.

Furthermore, the design of the pallets is strongly connected with the ergonomics of the printer so that a redesign of the pallet is a long term project, and the pallet is a long-term part for the printer.

SUMMARY OF THE INVENTION

The present embodiments divide the pallet into a pallet frame that is designed for the printer machine, and a removable garment part of the pallet that is specific to the garment and is easily exchangeable while the heavier frame is left in place.

According to an aspect of some embodiments of the present invention there is provided a modular pallet for a textile printing machine, to hold textile products of different shapes and sizes taut to allow for effective printing on the products, the modular pallet comprising:

a first part, the first part connected to the printing machine and configured to alternate between open and closed positions, the first part comprising at least one attachment for removably fitting a second part; and the second part, removably attachable to the first part, the second part being configured to hold taut at least one of a size and shape of a textile product currently to be printed when the first part is in the closed position.

In an embodiment, the first part comprises an attachment base for attaching to the textile printing machine, and a main frame for fitting the second exchangeable parts thereto.

In an embodiment, the main frame is pivotally attached to the attachment base.

An embodiment may comprise an opening and closing mechanism for moving the main frame between the open and the closed positions, the opening and closing mechanism being mounted on the first part.

In an embodiment, the opening and closing mechanism comprises at least one member of the group comprising: an actuator, a magnet, a microswitch, a hinge and a powered spring.

In an embodiment, the second part comprises a pallet tray connectable to the main frame and sized and shaped for a given textile product.

In an embodiment, the second part comprises a holding frame connectable to the main frame for holding a garment taut when in the closed position, the holding frame sized and shaped for a given textile product.

In an embodiment, the second part comprises a top frame component, the top frame component fixable into the pallet tray to provide a second printing surface for the textile product.

Embodiments may include a third part which is insertable into the second part and has a back support removably positionable for extending a part of a back of the textile product into a printing plane. That is to say, the textile product may be a shirt or the like having a back and a front. When the garment is placed on the pallet, the front is in the printing plane and the back is behind the front and out of sight. However, some of the back, particularly that part of the back close to the collar may be exposed. Nevertheless the exposed back is lower than the front and thus is out of the printing plane. The idea of the support part is to push an area of the exposed back up to the printing plane so that it may be printed on. Thus it becomes possible to print a label onto the garment on the inside upper back of the garment, and the need for a separate sewn-on label is obviated.

According to a second aspect of the present invention, there is provided a modular pallet for a textile printing machine, to hold textile products of different shapes and sizes to allow for effective printing on the products, the modular pallet comprising:

a first part, the first part attached to the printing machine; and a plurality of differently configured second, exchangeable parts, each of the differently configured exchangeable parts being removably attachable via a fitting to the first part, each of the different configured second parts being configured for at least one of a size and shape of one of a range of textile products to be printed.

In an embodiment, the first part comprises an attachment base for attaching to the textile printing machine, and a main frame for fitting the second exchangeable parts thereto.

In an embodiment, the main frame is pivotally attached to the attachment base.

In an embodiment, at least one of the second parts comprises a pallet tray connectable to the main frame and sized and shaped for a given textile product.

In an embodiment, at least one of the second parts comprises a holding frame connectable to the main frame for holding a garment taut when in a closed position, the holding frame sized and shaped for a given textile product.

In an embodiment, at least one of the second parts comprises a top frame component, the top frame component fixable into the pallet tray to provide a second printing surface for the textile product.

According to a third aspect of the present invention there is provided a method of printing a garment comprising:

Selecting a garment of a first size and shape for printing;

Modifying a printing pallet by inserting on a main frame of the pallet at least one additional part selected for the first size and shape;

Fitting the garment on the modified printing pallet;

Closing the pallet over the garment; and

Printing the garment while held in the pallet.

In the method, the at least one additional part comprises a holding frame based on the first size and shape for modifying a size of the main frame to hold the garment.

In the method, the at least one additional part further comprises a pallet tray based on the first size and shape to underlie the selected garment during printing.

The method may comprise:

selecting a garment of a second size and shape for printing subsequently to printing the first garment;

further modifying the printing pallet by removing the additional part selected for the first size and shape and inserting an alternative additional part selected for the second size and shape;

fitting the garment of the second size and shape on the modified printing pallet;

closing the pallet over the garment of the second size and shape; and printing the garment of the second size and shape while held in the pallet.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2:
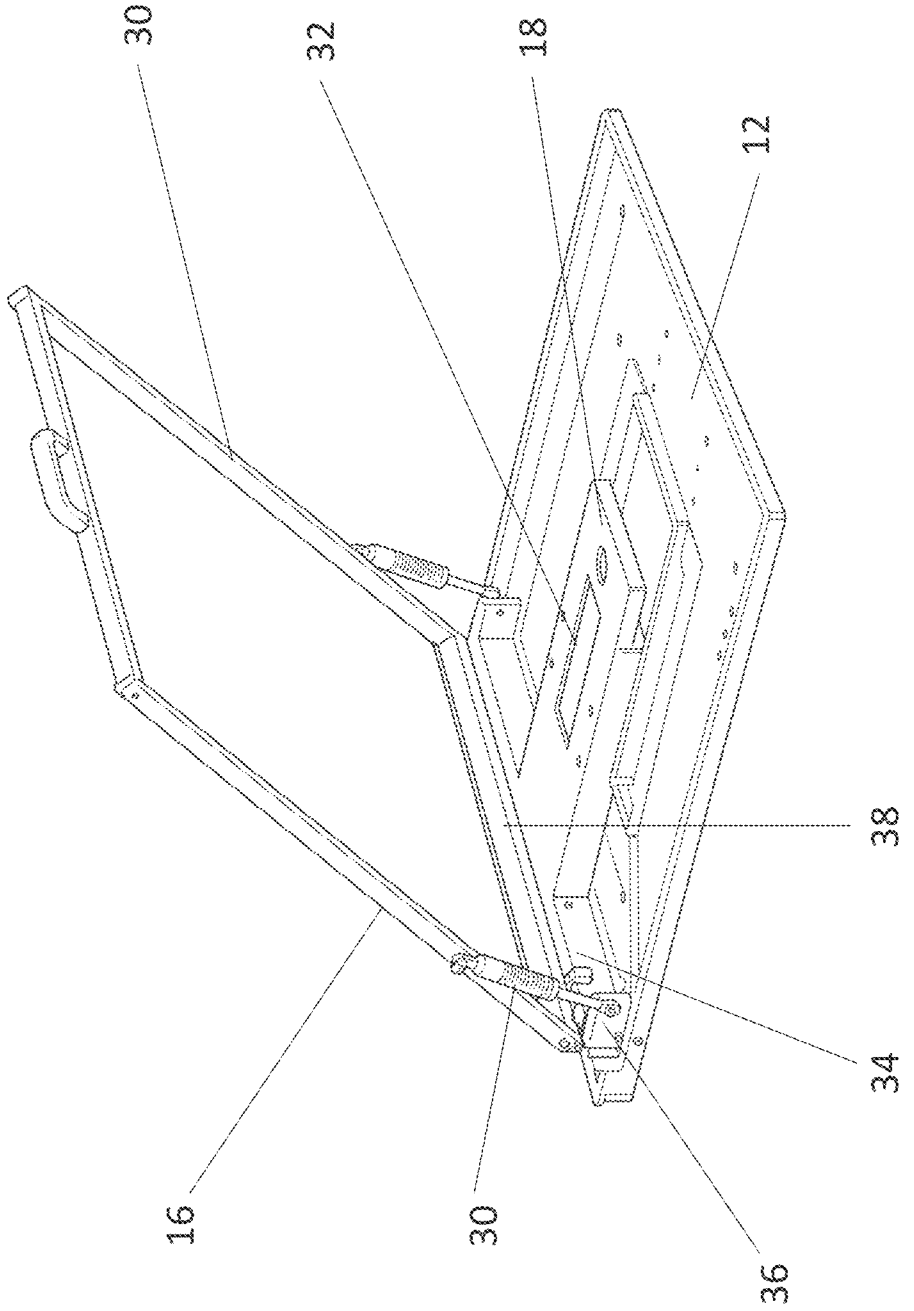
Figure 3B:
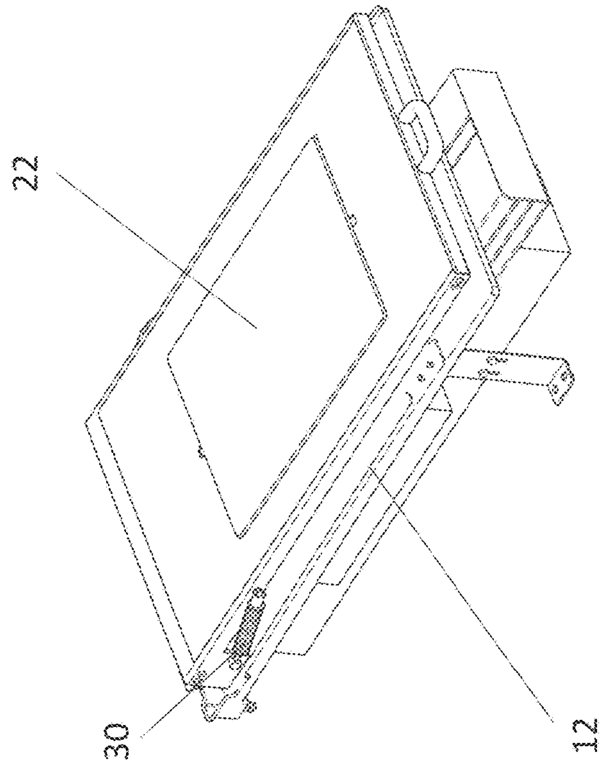
Figure 3A:
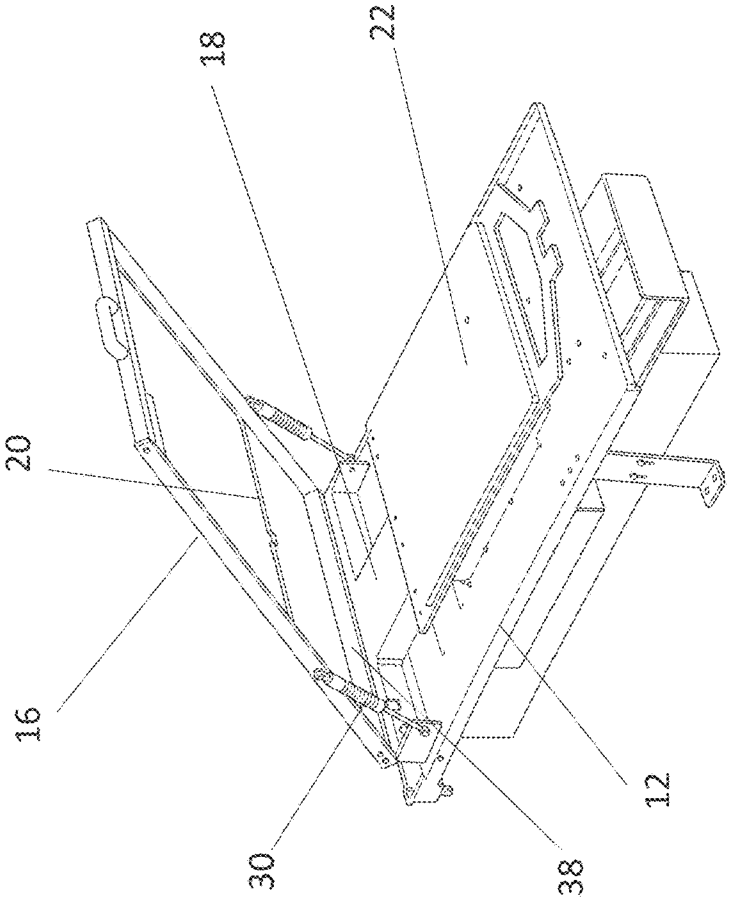
Figure 4B:
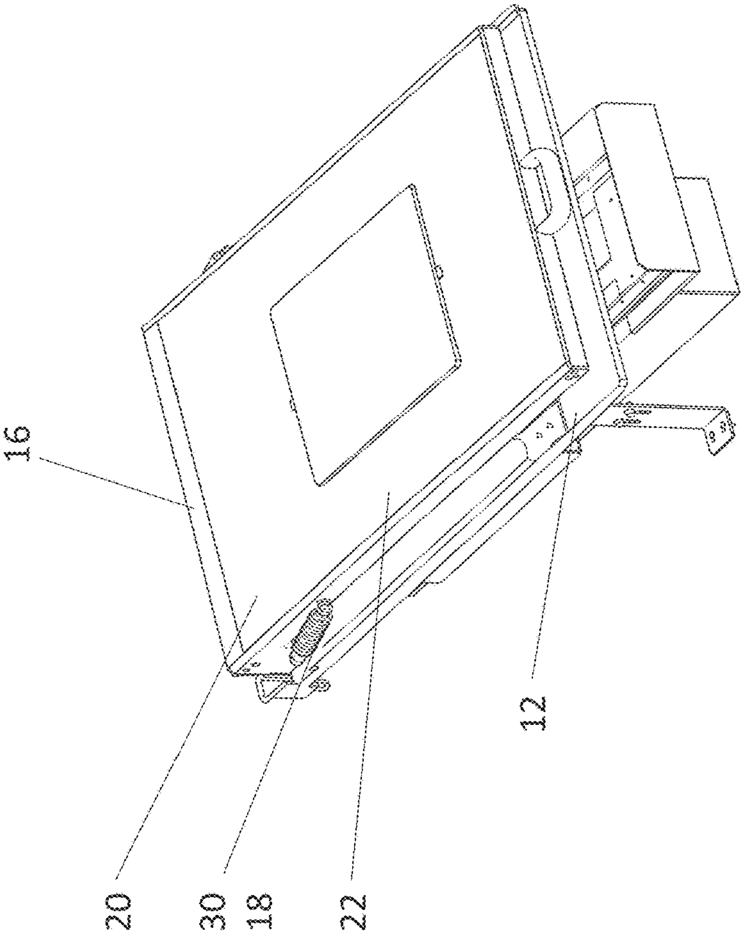
Figure 4A:
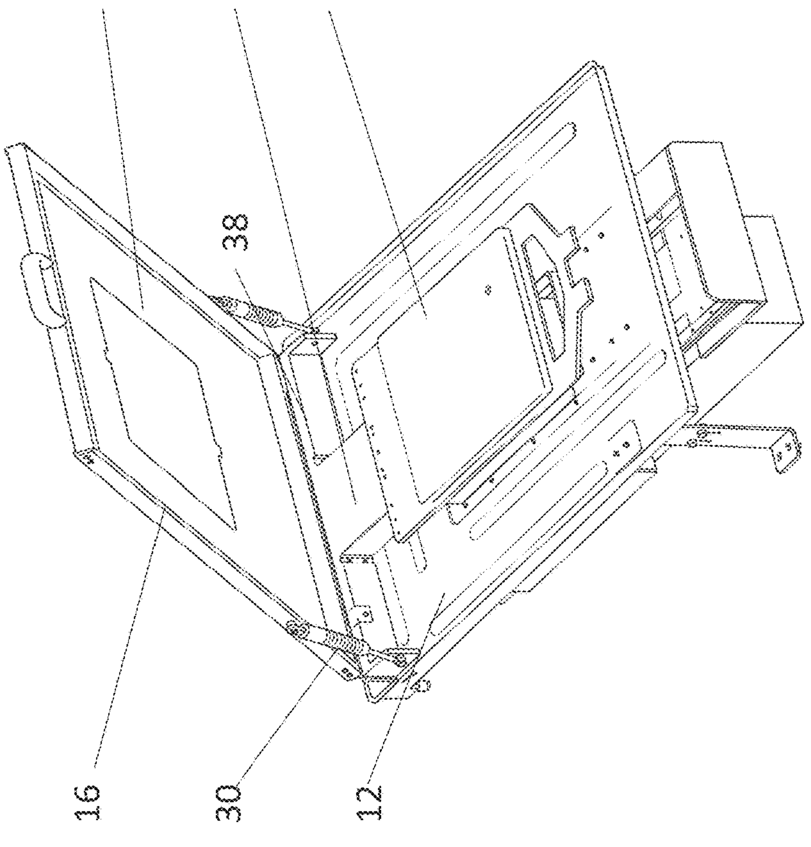
Figure 5:
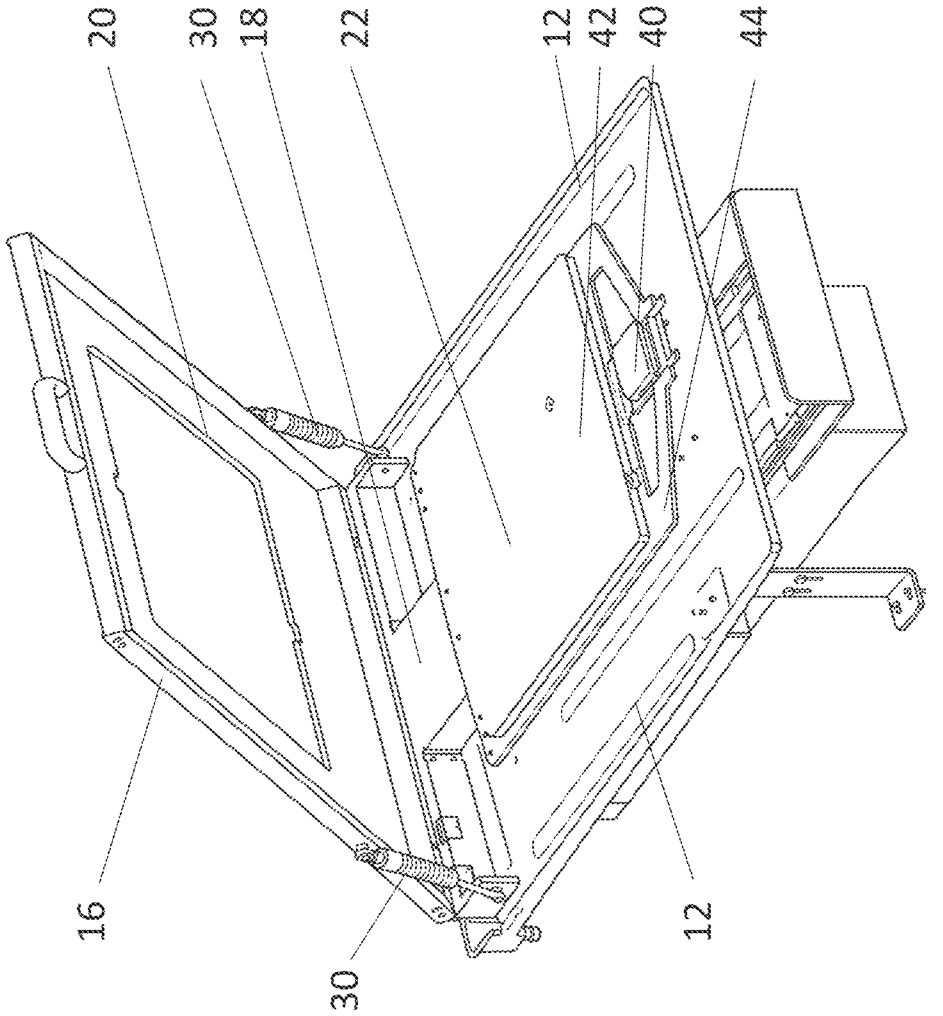
Figure 7:
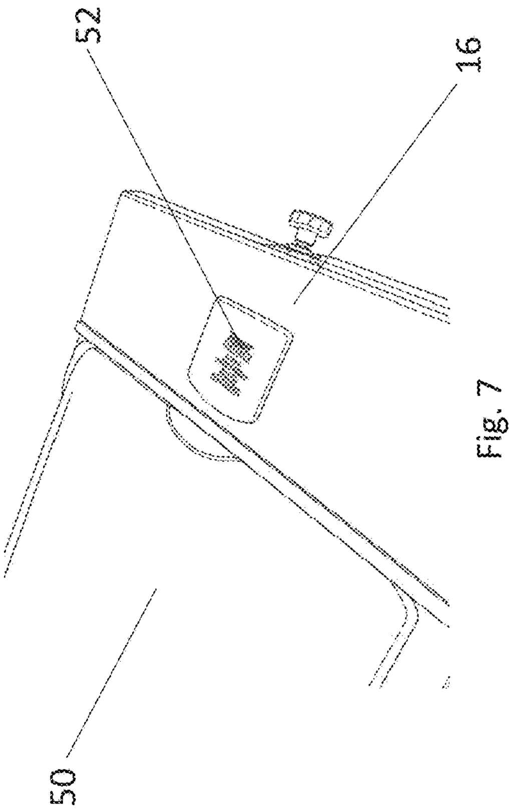
Figure 8:
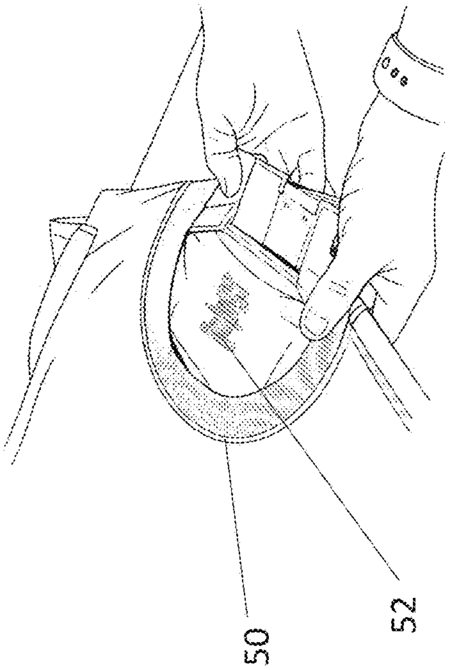
Figure 6:
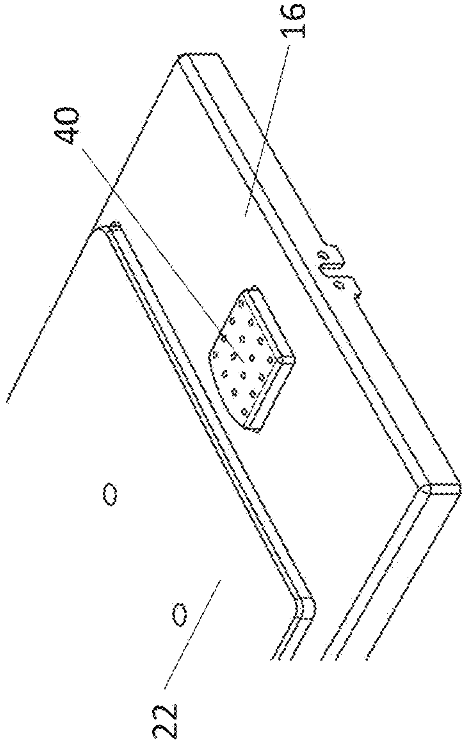
Figure 9:
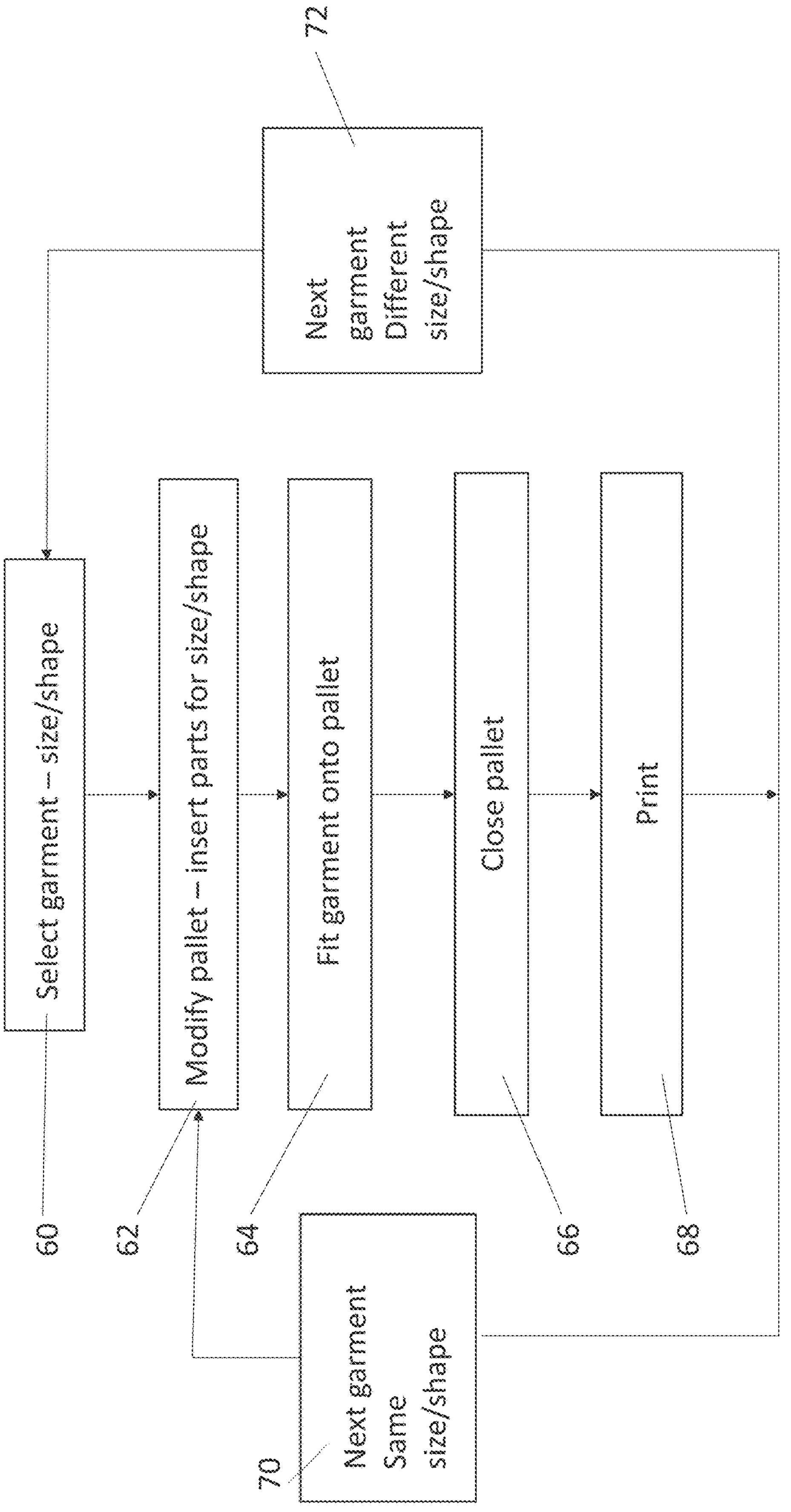
Figure 11:
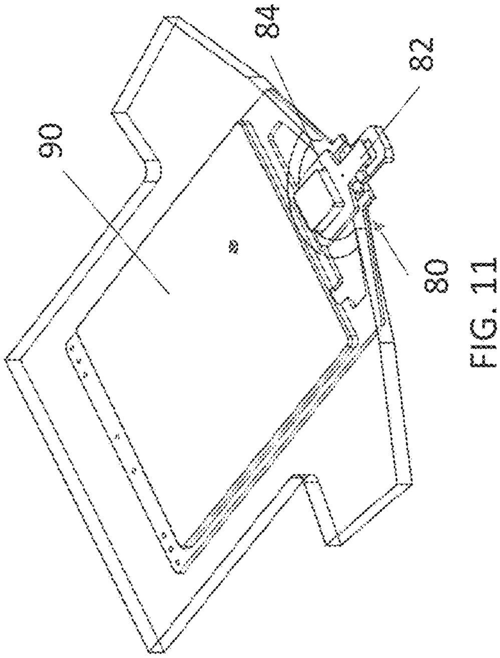

In the drawings:

FIG. 1 is a simplified schematic diagram illustrating fixed and variable parts of a modular pallet for a digital printer according to a first embodiment of the present invention; and FIG. 2 is a simplified diagram showing in greater detail the fixed parts of the modular pallet of FIG. 1; and FIGS. 3A and 3B are simplified schematic diagrams showing open and closed positions respectively of the modular pallet of FIG. 1 in a configuration typical for adult male garments; and FIGS. 4A and 4B are simplified schematic diagrams showing open and closed positions respectively of the modular pallet of FIG. 1 in a configuration typical for women's or children's garments; and FIG. 5 is a simplified schematic diagram showing a configuration of the pallet of FIG. 1 for tagless label printing; and FIG. 6 is a simplified diagram showing the pallet in the configuration of FIG. 5 closed and without a garment; and FIG. 7 is a simplified diagram showing the pallet of FIG. 5 in the closed position with a garment; and FIG. 8 is a simplified diagram showing the pallet of FIG. 5 opened subsequently to tagless label printing;

FIG. 9 is a simplified flow diagram showing a printing process carried out in accordance with the present embodiments; and FIGS. 10, 11, 12 and 13 are three simplified views of an add-on feature for printing labels on a garment.

DESCRIPTION OF SPECIFIC EMBODIMENTS OF THE INVENTION

The present invention, in some embodiments thereof, relates to a pallet and, more particularly, but not exclusively, to a holding or feeding pallet for a textile printing machine.

The present embodiments may provide a modular pallet for a textile printing machine, to hold textile products of different shapes and sizes to allow for effective printing on the products, the modular pallet having two parts, a first part which is fixed to the printing machine and is designed for removably fitting a second, modular part. The second part is made up of a range of exchangeable parts which are shaped and configured for different textile products. Each exchangeable part is able to fit into the first part, so that the pallet can be modified for printing different textile products.

The present embodiments are thus based on dividing the pallet into two parts, firstly the relatively complex parts that are part of the printer main platform and secondly, the relatively simple and low-cost parts that are specific to the garment and are replaced for specific applications. The first part may comprise a base that fits onto the printing machine and a pivotally attached main frame that moves between an open and a closed position. The second part may consist of a pallet tray that slides into the main frame and a holding frame that also slides into the main frame. The holding frame holds the garment taut on the pallet tray for printing. Different sized and shaped textile products require different sized pallet trays and frames and the parts being slidable allows for suitable pallet trays and frames to be provided without having to replace any of the parts fixed to the machine. If the parts fixed to the machine have to be exchanged each time as with the existing art, then not only is there heavy equipment to be moved, but the newly fitted pallet would have to be calibrated for flatness, thickness and position to work with the printer.

The present embodiments, by allowing for exchange of the holding frame and the pallet tray may ensure that the pallet is always compatible with the current printer interface, which is selected for printing the specific garment or other textile product. Herein reference to garments includes other textile products such as tote bags and the like. The pallet may support major garments sizes and types by simple interchange of the inner part of the pallet. The pallet switch time may be less than 10 seconds since the garment specific part is easy to slide in and out. The pallet may give an accuracy of better than 20 um, that is in terms of flatness, since the frame is never changed. The frame is the existing frame, and thus will be compatible with current installed bases of the pallets. According to embodiments there may be automatic identification of pallet type, as will be explained hereinbelow. High cost parts, namely the frame, remain on the printer. Moreover, the high cost high precision frame is provided only once. Currently, separate pallets for every desired type and size of garment have to be supplied with each printer, so that the cost of the machine is significantly reduced, and only low cost parts are provide separately and replaced per application. The weight of the parts to be replaced is around 2 kg, rather than more than 10 kg in the case of replacing the entire pallet.

The standard pallet has microswitches to determine whether the pallet is present, and/or RFIDs and identification is repeated each time to determine that the correct pallet is present. According to the present embodiments, the pallet is built as a fixed outer frame and exchangeable garment carrying inserts as mentioned. In this way it is easier to provide a greater variety of garment specific and even process specific inserts without significantly increasing the cost of the machine. Thus it is possible to have a specific garment insert for shirts with pockets and a separate insert for the same size shirt without a top pocket, meaning that the pallet insert may provide level correction for pockets and the like. By contrast, with the current art, the pocket and the shirt, being at different levels, usually have to be printed separately, or care is taken not to print over the pocket.

The main frame and base according to the present embodiments are designed for the ergonomics of the machine and provide necessary features and take any shaped pallet inserts, as fittings, so that for example it is possible to provide an insert that is narrow for sleeves or trouser legs.

The present embodiments furthermore do not affect the applicability of the full heavy pallets, which may still be used. In an embodiment, it is possible to provide an identification feature, for example an RFID in the pallet insert so that the printing machine can determine which pallet is fitted and can find a suitable program, or obtain relevant settings, or can even issue a warning if there is a mismatch between the printing program and the garment type of the pallet.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a simplified exploded diagram of a modular pallet according to a first embodiment of the present invention.

As shown in FIG. 1, modular pallet 10 comprises a mechanical main base 12 which fits accurately to the printing machine. The main base 12 includes foot section 14 to which a main frame 16 is bolted on via arm 18. The main frame 16 is pivotally attached to the arm. The base 12, the arm 18, and the pivotally attached main frame 16 are part of the printer's platform and are mostly not replaced for different printing operations.

The main frame 16 and arm 18 generally contain the various mechanical systems forming the opening and closing mechanism of the pallet, such as gas-springs, safety latch, open/close latch, open/close handle, magnets, hinges, etc. and these remain on the printer as a fixed base for all the different printing options.

Other parts, typically replaceable slidable holding frame part 20, main pallet tray 22 and top pallet 24 fit on to the main frame 16 and are consequently replaceable and interchangeable. The slidable holding frame part 20, the main pallet tray 22 and the top pallet 24 are typically lightweight, simple and low-cost and enable the different garment types, sizes and applications, as will be explained in greater detail below.

In use, the base 12, the main frame 16 and the arm 18 remain fixed to the machine, and the slidable holding frame part 20, the main pallet tray 22 and the top pallet 24 are exchanged for different garment sizes and types or provided as necessary for specific operations. Thus the main pallet tray 22 and the slideable frame part 20 may be selected for shirts of sizes XS to XXXL. In order to support smaller shirts or raised parts (e.g. pockets)—the top pallet 24 may be added to compensate for different thicknesses and provide the printer with a uniform thickness to work on. In addition, a variation of the top pallet 24 may be used for printing of tag or label information on the inside surface of the garment, as will be described hereinbelow in respect of FIGS. 5-8.

Reference is now made to FIG. 2, which illustrates the base 12 and main frame 16, which is the state of the printer machine when no specific parts for particular operations are present. The figure shows how the above-mentioned mechanical systems of the opening and closing mechanism may be incorporated explicitly into the main frame 16 and base 12 and thus do not need to be part of the changeable parts and exchanged each time.

Gas-springs 30 at either side of the main frame 16 enable actuation of the opening and closing of the frame 16 at a pivotal attachment to the arm 18.

A QR and RFID antenna 32 may fit on arm 18. A cover close magnet 34 may be used to retain the pallet in the closed position as necessary, typically after fitting the garment and until printing is complete, and is associated with a cover close microswitch 36 which senses whether the cover is in fact closed or not. Hinge 38 between the main frame 12 and arm 18 may provide the pivotal attachment described above.

Reference is now made to FIGS. 3A and 3B, which are simplified diagrams that illustrate a standard pallet configuration for men's shirts in open and closed positions respectively. Parts that are the same as in previous figures are given the same reference numerals and are not described again except for the purposes of understanding the present embodiment.

As shown in FIGS. 3A and 3B, slidable frame part 20 selected for the shirt size slides into main frame 16. Main pallet 22 is also selected for the shirt size.

Reference is now made to FIGS. 4A and 4B which illustrate a standard pallet configuration for women's or children's shirts in open and closed positions respectively. Parts that are the same as in previous figures are given the same reference numerals and are not described again except for the purposes of understanding the present embodiment.

As shown in FIGS. 4A and 4B, slidable frame part 20 selected for the shirt size slides into main frame 16 as before but is larger. Main pallet 22 is also selected for the shirt size.

Reference is now made to FIG. 5, which illustrates a further configuration of the pallet according to embodiments of the present invention, in which printing directly onto the shirt of tag information or the like is enabled, thus removing the need for adding a tag or label to the garment etc.

As shown in FIG. 5, a slide in back support part 40 is inserted into main pallet 22. The slide-in back support part is a variation of the top pallet 24 referred to hereinabove which is used for pockets and the like. The slide in back-support part may be flush with the plane of the main pallet tray 22. The slide-in part may be fitted onto both the body 42 and arms 44 of the main pallet tray 22.

As shown in FIG. 6, the main frame 16 and holding frame 20 may be closed over the back support part 40, causing the back support part 40 to protrude from the holding frame 20 into the plane of the main pallet 22. A specific configuration of the holding frame 20 may be shaped to allow for the protrusion of the back support part 40.

FIG. 7 illustrates the pallet closed over garment 50 and shows a part 52 of the garment immediately below the collar on the back part of the garment to be stretched slightly upwards to the printing plane by the back support 40. The raised part of the back may thus be printed on at the same time as printing over the front of the garment to allow printing of both the shirt outside design and the label in one operation.

FIG. 8 shows the printed label with the frame removed.

Reference is now made to FIG. 9, which is a simplified flow chart showing a process involving modifying pallets and printing according to embodiments of the present invention.

A garment—or other textile such as a tote bag—is selected for printing—60. The product has a particular size and shape. The pallet is modified—62—for the particular size and shape by adding to the main frame a holding frame or pallet tray and if needed a top tray, all selected as necessary for the given size and shape. The garment is then fitted onto the pallet—64, and the pallet is closed—66—over the garment to hold the garment taut for printing. The garment is then printed—68—while held on the pallet.

The garment is then removed, and the next garment for printing is selected. If the next garment is the same size and shape—70—then flow continues with fitting the garment onto the pallet—64. On the other hand, if the garment is of a different size or shape—72, then flow returns to modifying the pallet—62.

The modular design also enables automatic recognition of the pallet type by RFID antenna on the static base and specific data-tags on each adapter. The system may use the identification accordingly to automatically adjust the printer's mode to the correct garment type, for example by changing the GUI, scan plan, print restrictions, and the like.

Reference is now made to FIGS. 10-13 which are three simplified views of the pallet and a garment being printed, where the pallet has an add-on attachment for printing the label. The add-on attachment serves the same purpose as the back support part 52 of FIG. 7.

Figure 13:
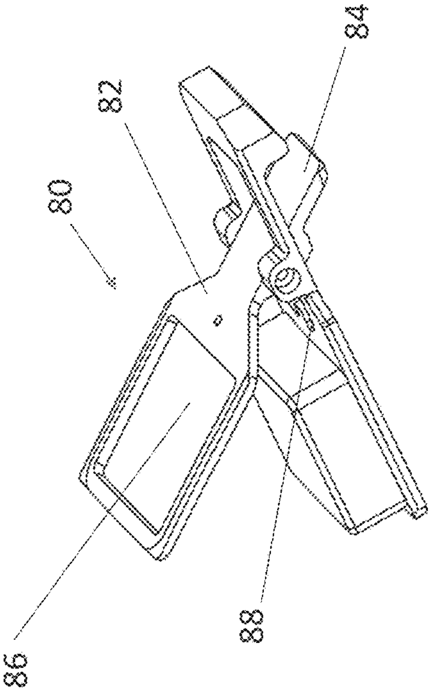
Figure 10:
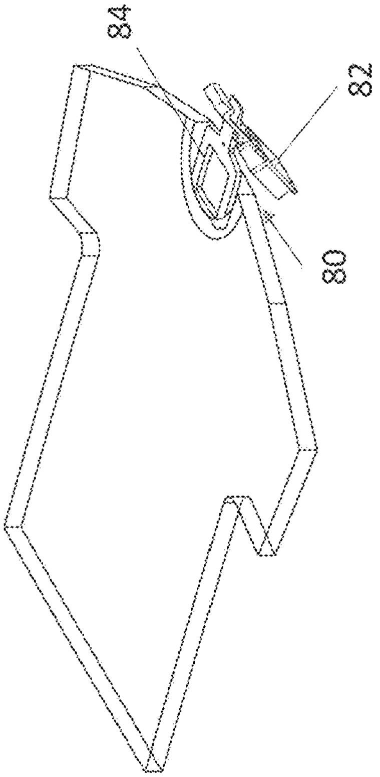
Figure 12:
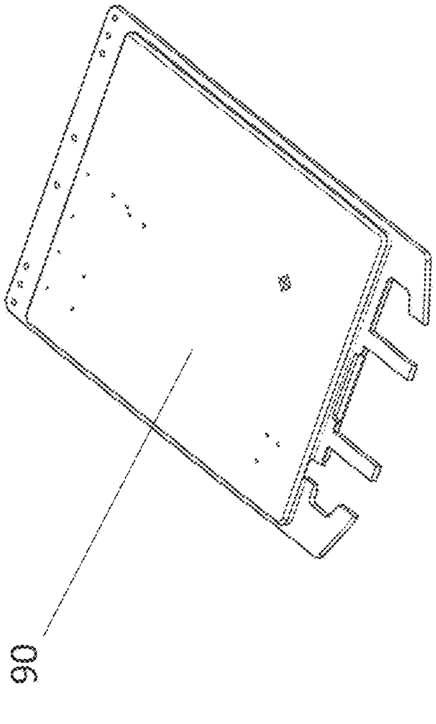

In greater detail, add on part 80 comprises a frame part 82 and a back support part 84 which is rotatably mounted in the frame part. The back support part 80 may be rotated between a first position—shown in FIG. 10, where it is below frame part 82 and a second position—shown in FIG. 11, in which it extends through the frame 80 to support a small area of the back of the garment so that the part of the garment extends into the printing plane. FIG. 13 illustrates the motion with arrows 86 and 88. Thus the back support part enables printing of a label onto the garment and thus enables labelling directly onto the garment without requiring a separate label to be stitched on to the garment. FIG. 12 shows a pallet 90 modified to take the add-on part 80. When the add-on part is not required, the back support part 84 is simply left in the retracted position as shown in FIG. 10.

That is to say, add-on part 80 may constitute a third part of the adjustable pallet, which is insertable into the second part, the pallet itself, and has a back support which may be rotated into position for extending a part of a back of the textile product into a printing plane, and may be rotated away when not needed.

The textile product may be a shirt or the like having a back and a front. When the garment is placed on the pallet, the front is in the printing plane, that is in the plane where the printing nozzles are designed to operate, and the back is behind the front of the garment and concealed. However, some of the back, particularly that part of the back close to the collar may be exposed. Nevertheless, the exposed back is lower than the front and thus is out of the printing plane. The idea of the support part 84 is to push a part of the exposed back of the garment up to the printing plane so that it may be printed on. Thus it becomes possible to print a label onto the inside upper back of the garment and the need for a separate sewn-on label is obviated.

It is expected that during the life of a patent maturing from this application many relevant digital printing devices to which a pallet of the present embodiments is applicable will be developed, as well as new feed methods and identification technologies and the scopes of these and other corresponding terms are intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A modular pallet for a textile printing machine, to hold textile products of different shapes and sizes taut to allow for effective printing on said products, the modular pallet comprising:

a first part, the first part comprising a frame, the frame having a length and a width, the frame connected to the printing machine and configured to alternate between open and closed positions, the first part comprising at least one attachment for removably fitting a second part, the attachment being configured for accurate location of said second part, said attachment comprising first and second U-shaped grooves for accepting said second part at a given alignment and allowing said second part to slide linearly along said length of said frame at said given alignment into a secured position, the secured position being along said length and reachable by said linear sliding along said length, for opening and closing of said first part and second part together while being secured; and the second part, attachable to said first part, said second part being configured for fitting a textile product while secured in said secured position and said first part is in said open position and to hold taut at least one of a size and shape of said textile product currently to be printed when connected to said first part in said secured position and said first part is in said closed position, wherein said second part comprises a pallet tray connectable to said main frame and sized and shaped for a given textile product.

2. The modular pallet of claim 1, wherein said first part comprises an attachment base for attaching to said textile printing machine, and a main frame for fitting said second part thereto.

3. The modular pallet of claim 1, wherein said main frame is pivotally attached to said attachment base.

4. The modular pallet of claim 3, comprising an opening and closing mechanism for moving said main frame between said open and said closed positions, said opening and closing mechanism being mounted on said first part.

5. The modular pallet of claim 4, wherein said opening and closing mechanism comprises at least one member of the group comprising: an actuator, a magnet, a microswitch, a hinge and a powered spring.

6. The modular pallet of claim 1, wherein said second part comprises a holding frame connectable to said main frame for holding a garment taut when in said closed position, the holding frame sized and shaped for a given textile product.

7. The modular pallet of claim 1, comprising a third part, the third part being insertable into said second part and comprising a back support removably positionable for extending a part of a back of said textile product into a printing plane.

8. The modular pallet of claim 1, said second part further comprising a top frame component, said top frame component fixable into said pallet tray to provide a second printing surface for said textile product, said top frame component being variably selectable to compensate for different thicknesses and thereby provide the printer with a uniform height for printing thereon, irrespective of a thickness of the garment.

9. A modular pallet for a textile printing machine, to hold textile products of different shapes and sizes to allow for effective printing on said products, the modular pallet comprising:

a first part, the first part attached to the printing machine, and having a length and a width; and a plurality of differently configured second, exchangeable parts, each of the differently configured exchangeable parts being removably attachable along said length, via a fitting, to said first part, the fitting being configured for accurate location of said second part into said first part and comprising a mechanical latching mechanism for latching said second part onto said first part to be openable and closeable while latched, said mechanical mechanism comprising first and second U-shaped grooves extending along said length of said first part along which said second part is able to slide linearly at a given alignment into a secured position, said secured position being reachable by said linear sliding, said second part to be openable and closeable while secured; each of the different configured second parts being configured for at least one of a size and shape of one of a range of textile products to be printed.

10. The modular pallet of claim 9, wherein said first part comprises an attachment base for attaching to said textile printing machine, and a main frame for fitting said second exchangeable parts thereto.

11. The modular pallet of claim 10, wherein said main frame is pivotally attached to said attachment base.

12. The modular pallet of claim 11, comprising an opening and closing mechanism for moving said main frame between an open and a closed position, said opening and closing mechanism being mounted on said first part.

13. The modular pallet of claim 12, wherein said opening and closing mechanism comprises at least one member of the group comprising: an actuator, a magnet, a microswitch, a hinge and a powered spring.

14. The modular pallet of claim 9, wherein at least one of said second parts comprises a pallet tray connectable to said main frame and sized and shaped for a given textile product.

15. The modular pallet of claim 14, wherein at least one of said second parts comprises a top frame component, said top frame component fixable into said pallet tray to provide a second printing surface for said textile product, said top frame component being variably selectable to compensate for different garment thicknesses and thereby provide the printer with a uniform height for printing thereon.

16. The modular pallet of claim 9, wherein at least one of said second parts comprises a holding frame connectable to said main frame for holding a garment taut when in a closed position, the holding frame sized and shaped for a given textile product.

17. The modular pallet of claim 9, comprising a third part, the third part being insertable into said second part and comprising a back support removably positionable for extending a part of a back of said textile product into a printing plane.

18. A method of printing a garment comprising:

selecting a garment of a first size and shape for printing;

modifying a printing pallet by accurately locating through linear sliding along first and second U-shaped grooves into a secured position at least one additional part and mechanically securing said at least one additional part, at said secured position, on a main frame of said pallet, said printing pallet comprising said first and second U-shaped grooves extending along a length of said printing pallet upon which said at least one additional part is able to slide linearly at an alignment defined by said U-shaped grooves, into the secured position to be openable and closeable while secured; said at least one additional part being selected for said first size and shape, said linear sliding along said U-shaped grooves being along a length of said main frame of said pallet and said secured position being reachable via said linear sliding along said groove;

fitting said garment on said modified printing pallet while said main frame and said additional part are secured together;

closing said pallet over said garment while said main frame and said additional part remain secured together;

providing a uniform height for printing thereon irrespective of a garment thickness, in that said at least one additional part comprises a pallet tray connected to said main frame and sized and shaped for a given textile product, wherein said additional part comprises a top frame component, said top frame component being fixed into said pallet tray to provide a second printing surface for said textile product, said top frame component being configured to compensate for different garment thicknesses; and printing said garment while held in said pallet.

19. The method of claim 18, wherein said at least one additional part comprises a holding frame based on said first size and shape for modifying a size of said main frame to hold said garment.

20. The method of claim 19, wherein said at least one additional part further comprises a pallet tray based on said first size and shape to underlie said selected garment during printing.

21. The method of claim 18, comprising:

selecting a garment of a second size and shape for printing subsequently to printing said first garment;

further modifying said printing pallet by removing said additional part selected for said first size and shape and inserting an alternative additional part selected for said second size and shape;

fitting said garment of said second size and shape on said modified printing pallet;

closing said pallet over said garment of said second size and shape; and printing said garment of said second size and shape while held in said pallet.

* * * * *